(12) United States Patent
Van Overveld (10) Patent No.: US 7,089,216 B2
(45) Date of Patent: Aug. 8, 2006

(54) METHOD AND SYSTEM FOR GENERATING A RECOMMENDATION FOR A SELECTION OF A PIECE OF CLOTHING

(75) Inventor: Cornelius Wilhelmus Antonius Marie Van Overveld, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 123 days.

(21) Appl. No.: 09/933,782

(22) Filed: Aug. 21, 2001

(65) Prior Publication Data

US 2002/0045959 A1 Apr. 18, 2002

(30) Foreign Application Priority Data

Aug. 23, 2000 (EP) .................................. 00202948

(51) Int. Cl.
*G06F 15/18* (2006.01)
(52) U.S. Cl. .............................. 706/12; 706/11; 706/14
(58) Field of Classification Search .................. 706/12, 706/11, 14
See application file for complete search history.

(56) References Cited

U.S. PATENT DOCUMENTS

| | | | | |
|---|---|---|---|---|
| 6,055,513 A | * | 4/2000 | Katz et al. | 705/26 |
| 6,070,149 A | * | 5/2000 | Tavor et al. | 705/26 |
| 6,313,745 B1 | * | 11/2001 | Suzuki | 340/572.1 |
| 6,427,132 B1 | * | 7/2002 | Bowman-Amuah | 703/22 |
| 6,697,824 B1 | * | 2/2004 | Bowman-Amuah | 709/229 |

OTHER PUBLICATIONS

N. Mankovich et al., "Method and System for Purchasing Content Related Material", Filed Feb. 3, 2000, U.S. Appl. No. 09/498,261.

* cited by examiner

*Primary Examiner*—Joseph P. Hirl (57) ABSTRACT

The invention relates to a system (120) that makes recommendations on what to wear. Clothes (101–105) are tagged (106–110) so that taking them out of storage (100) can be detected. Using this information, a user profile is updated. This way, the system (120) learns from the user's behavior and is able to generate more accurate recommendations over time. The user profile can be stored on a smart card (320), so a user can use it in a shop to buy new clothes that fit with his current set (101–105). The user profile can also be used for targeted advertising.

22 Claims, 2 Drawing Sheets

METHOD AND SYSTEM FOR GENERATING A RECOMMENDATION FOR A SELECTION OF A PIECE OF CLOTHING

The invention relates to a method of generating a recommendation for a selection of a piece of clothing.

The invention further relates to a system for generating a recommendation for a selection of a piece of clothing.

The invention further relates to a method of presenting a targeted clothing advertisement to a user.

In the Western world, economic standards are high enough to allow a fair amount of luxury in the average household. Clothes, shoes and accessories are among the products that most people possess in excess of the basic needs. It is not uncommon for a middle-class woman in her mid-thirties to own, say, 10 pairs of shoes; 20 pairs of stockings and socks; 10 pairs of trousers+8 skirts or dresses; 15 blouses; 10 sweaters; 10 shawls; 5 coats; 3 hats; 4 handbags; 10 necklaces; 6 bracelets; 4 brooches; 6 pairs of earrings.

The daily process of getting dressed, therefore, amounts to selecting one possibility out of a space of $4.6 \times 10^{11}$ items. For most men, a similar observation leads to a significantly smaller, but still huge set of possibilities. Even if a woman would like to look different on every day of her life, she has still far more than 3 million options per day. This selection procedure, however, is far from trivial.

Although some people may enjoy consciously dealing with this selection process every morning, others spend little attention to it (using few, partly implicit, default rules, completed with hap-hazard choices, thus ignoring vast subspaces of combination options), and again others find it a source of despair; indeed, it can cause irritation within family life if family members have very different opinions and rituals regarding this process.

On a less regular basis, this selection problem occurs in an even larger form when it comes to buying clothes, shoes or accessories. The combinatorial explosion that results from having to choose a blouse and trousers that fit together (and that fit to the already existing wardrobe) from the vast assortment of a fashion shop is huge.

Current recommendations are made through systems such as billboards and advertisements on TV, and through fashion magazines and the likes. However, such recommendations are very generic and hardly ever personalized. This makes them rather inaccurate and of little use for most people.

It is an object of the invention to provide a method which provides an accurate personalized recommendation.

This object is achieved according to the invention in a method comprising maintaining a clothing profile, detecting a piece of clothing being selected and updating the clothing profile based on said selection, and generating the recommendation from the updated clothing profile. The clothing profile indicates the pieces of clothing which the user likes, and the pieces which he has in his possession. This makes it possible to determine with a high degree of accuracy which piece of clothing, or which combination of clothes would be of interest to the user. This gives an accurate recommendation.

It is a further object of the invention to provide a system which provides an accurate personalized recommendation.

This object is achieved in a system comprising user profiling means for maintaining a clothing profile, detection means for detecting a piece of clothing being selected, coupled to the user profiling means for updating the clothing profile based on the selected piece of clothing, recommendation means for generating a recommendation from the updated clothing profile, and presentation means for presenting the recommendation to the user. The clothing profile indicates the pieces of clothing which the user likes, and the pieces which he has in his possession. This makes it possible to determine with a high degree of accuracy which piece of clothing, or which combination of clothes would be of interest to the user. This gives an accurate recommendation. The recommendation can be presented to the user, preferably in a visual form, e.g. a rendered virtual mannequin.

In an embodiment generating the recommendation comprises determining a list of available pieces of clothing, combining plural pieces from the list to form a collection of subsets, the recommendation comprising at least one subset from the collection of subsets. Preferably, a number of subsets that are not suitable for a present situation are eliminated from the collection. This is a simple yet effective way of generating the recommendation.

In a further embodiment the user profiling means are coupled to smart card read/write means for maintaining the clothing profile stored on a smart card. By storing the user profile on a smart card, the user can take it with him, for example when he goes shopping for clothes. This way, he always has his clothing profile with him.

In a further embodiment the system further comprises input means for determining a purpose for which the piece of clothing has been selected, the user profiling means being arranged for updating the clothing profile further based on the determined purpose. It might happen that the user selects the piece of clothing not to wear it, but for example to take it out for dry cleaning. In such a case, the clothing profile should not be updated to reflect that the user wants to wear that piece of clothing. By providing input means, the purpose can be determined, for example by allowing the user to enter the purpose manually.

In a further embodiment the input means are arranged for determining the purpose based on an appointment in an electronic calendar. By applying active feedback, using input from the user, and/or passive feedback, using information from the user's electronic calendar, the purpose for which the piece of clothing has been selected can be determined. The passive feedback method is particularly advantageous, since it minimizes the interaction of the user with the system. The electronic calendar provides information on activities to be performed by the user, such as a meeting with clients, which can be used to determine suitable clothing.

It is a further object of the invention to provide a method of presenting a targeted clothing advertisement to a user.

This object is achieved in a method comprising obtaining a clothing profile for the user, determining a clothing product that matches the clothing profile, and sending an identifier of the clothing product to the user. The clothing profile indicates the pieces of clothing which the user likes, and the pieces which he has in his possession. This makes it possible to determine a new clothing product which the user would like, given his clothing profile, and which he does not have yet. Advertising that new clothing product to the user then has a high chance of being accurate.

Various advantageous embodiments are set out in the dependent claims.

These and other aspects of the invention will be apparent from and elucidated with reference to the embodiments shown in the drawing, in which.

Throughout the figures, same reference numerals indicate similar or corresponding features. Some of the features indicated in the drawings are typically implemented in software, and as such represent software entities, such as software modules or objects.

In the Western world, economic standards are high enough to allow a fair amount of luxury in the average household. Clothes, shoes and accessories are among the products that most people possess in excess of the basic needs. It is not uncommon for a middle-class woman in her mid-thirties to own, say, 10 pairs of shoes; 20 pairs of stockings and socks; 10 pairs of trousers+8 skirts or dresses; 15 blouses; 10 sweaters; 10 shawls; 5 coats; 3 hats; 4 handbags; 10 necklaces; 6 bracelets; 4 brooches; 6 pairs of earrings.

The daily process of getting dressed, therefore, amounts to selecting one possibility out of a space of $4.6 \times 10^{11}$ items. For most men, a similar observation leads to a significantly smaller, but still huge set of possibilities. Even if a woman would like to look different on every day of her life, she has still far more than 3 million options per day. This selection procedure, however, is far from trivial. There are numerous constraints. To mention a few:

1. Weather conditions (no thin blouses in Winter, unless under a woolen sweater; no short skirts when having to cycle in the rain).
2. Color and textile aesthetics (brown shoes don't go well with bluish clothes, except for jeans).
3. Shape aesthetics (a long sweater and a short coat don't go together).
4. Fashion (1) (if Madonna wears short socks in high-heel shoes, this is apparently a favored combination).
5. Fashion (2) (depending on the fashion industry, certain color schemes are preferred in some periods).
6. Availability (you can't wear things that are currently in the laundry).
7. Variability (you shouldn't wear the same combinations for too long).
8. Hygiene (you shouldn't wear a single piece of clothing for too long).
9. Comfort (wearing a coarse woolen sweater without a blouse underneath gives some people skin irritation).
10. Duties (a waitress, a lawyer, a secretary, a medical assistant, a sports coach, . . . all have to comply with certain dress codes during working hours).
11. Personal preference (1) ("today I feel like wearing bright colors").
12. Personal preference (2) ("green is my all-time favorite").

Note that these constraints come in various categories:
a. Constant (e.g. 2, 12) vs. variable (e.g. 1, 11).
b. Hard (e.g. 6) vs. soft (e.g. 4, 5).
c. Objectively decidable (e.g. 1, 3) vs. subjectively decidable (e.g. 9, 11).
d. Externally caused (e.g. 1, 5) vs. internally caused (e.g. 10, 11, 12).
e. Depending on history (e.g. 7, 8) vs. memory-less (e.g. 2, 9).

Although some people may enjoy consciously dealing with this selection process every morning, others spend little attention to it (using few, partly implicit, default rules, completed with hap-hazard choices, thus ignoring vast subspaces of combination options), and again others find it a source of despair; indeed, it can cause irritation within family life if family members have very different opinions and rituals regarding this process.

On a less regular basis, this selection problem occurs in an even larger form when it comes to buying clothes, shoes or accessories. The combinatorial explosion that results from having to choose a blouse and trousers that fit together (and that fit to the already existing wardrobe) from the vast assortment of a fashion shop is huge. Also, this version of the selection problem is characterized by some additional constraints:

13. Financial (what is the available budget? How much do I normally spend on shoes per year?).
14. Social (1) (in some circles, it is awkward to be seen in the same hat as one's friend).
15. Social (2) (in some circles, clothes should be from certain brands, or, if this conflicts with constraint 13, they should be look-alikes).
16. Market mechanisms (1) (what assortment is available when? Cheap Winter coats are not available in Winter, but in Spring they are on discount).
17. Market mechanisms (2) (for buying "the ideal" combination, several shops (with non-identical assortments) should be consulted. But you cannot spend indefinitely running from one shop to another, carrying clothes from one shop to the fitting room of another shop).

This adds some constraint categories:
f. Related to purchasing (13–17) vs. related to daily selection (1–17).
g. Related to short-term planning (e.g. 1, 11) vs. long range planning (e.g. 16).
h. Social (e.g. 4, 10, 14, 15) vs. individual (e.g. 9, 12, 13).

In summary, a problem with the process of selecting appropriate clothing is how to assist individuals in selecting clothes, shoes and accessories, both on a daily basis and when purchasing, while taking the above-mentioned constraints and considerations (1–17) into account.

Ever since fashion industry has developed as a distinct commercial endeavor, various initiatives for advice to individuals have been proposed and realized. Even before that date (probably dating back to the beginning of civilization) people have bothered to advise one another regarding what to wear. Indeed, apart from the primary function of clothes to shield against weather influences, clothes mainly serve to send messages to our fellow humans. Selecting clothes, therefore, is and will always be a social and communication-loaded process.

We distinguish various types of approaches to dress advice. We first give some traditional methods, that is, methods not related to (dedicated) technology:

|  | Individual (personalized) | Group-based (non-personalized) |
| --- | --- | --- |
| Dependent (tied to sales organization, factory, brand, shop, . . .) | [I] Fashion consultants, e.g. a personalized color palette, where in dependence of one's hair, skin and eye color and some other characteristics a set of well-matching colors is proposed - including recommendations for particular textiles. Also, | [II] Advertisements, commercials, billboards, catalogues and brochures, mannequins, fashion shows, clothing companies sponsoring films, shows or sports events, . . . (4, 5, 15, 16, 17). |

-continued

| | Individual (personalized) | Group-based (non-personalized) |
|---|---|---|
| Independent (not tied to sales organizations etc.) | some organizations offer the services of "personal purchase assistants" (2, 4, 5, 16, 17). [III] Family members, friends, colleagues, superiors (regarding dress codes in professional environment), ergonomic advisors, medical advisors, sports coaches, . . . (2, 3, 6, 7, 8, 9, 10, 13, 14). | [IV] Ladies magazines (to a lesser extent: men's magazines), television shows, film, (pop-) concerts, meteorologists (via weather reports), professional organizations that require uniforms, scouting and similar organizations, . . . (1, 2, 3, 4, 9, 10, 16). |

The numbers in parentheses indicate the types of constraints and considerations (1–17) that can be taken into account by means of this source for advice. Note that most relate to purchase advice; few related to the daily selection process. Next we discuss some novel or future methods (related to (dedicated) technology). Not all of these sources for advice may be in practical usage (yet), but they can all be envisaged with current Internet technology:

| | Individual (personalized) | Group-based (non-personalized) |
|---|---|---|
| Dependent (tied to sales organization, factory, brand, shop, . . . ) | [V] Virtual fashion shops, virtual personalized fashion shows. More interesting: Internet agents that attempt to record one's purchases over a certain period (similar to customer's purchase histories as maintained in shops or mail order houses) and try to build an individual user profile from these data. These agents could have built-in knowledge about color and shape aesthetics as well as market information. (2, 3, 4, 5, (12?), 13, 15, 16, 17). | [VI] Web-advertisements, based on user (class) profiles, chat boxes and news groups related to fashion etc. . . . (4, 5, 15, 16, 17). |
| Independent (not tied to sales organizations etc.) | [VII] Dedicated sites with interactive (virtual) fashion consultants; VR-based "do-it-yourself-virtual-wardrobe-design'-type applications (2, 3, 10, 13). | [VIII] News groups, virtual fashion shows . . . (1, 2, 3, 4, 9, 10, 16). |

It is observed that no single source for advice (I–VIII) accommodates with all constraints (1–17). In particular, the categories (I, III, V) and (II, IV, VI, VIII) are largely disjoint. The agent-based solution in VII (that may not exist yet, but that can be expected soon) is an interesting attempt to tie personal preferences (on the basis of a user profile as it is reconstructed from a person's purchase history) into market trends. However, this is mainly useful for selection in relation to new purchases, not for daily selection. A web-based agent has no detailed information about which clothes are worn when, and therefore it cannot advise with respect to the constraints 6, 7, 8, 9, 10, and 11. Also, the information about constraint 12 is limited, as it is solely obtained from purchasing history; further, although it may be able to advise on purchasing individual pieces, it has no information about preferred combinations, as it lacks knowledge about what is actually worn together. Moreover, a system such as in VII has no knowledge about the current wardrobe (the collection of clothes that were purchased other than via e-commerce), which is again a fundamental limitation with respect to its capability. Finally, it can never assist with respect to constraint 14.

Figure 1:
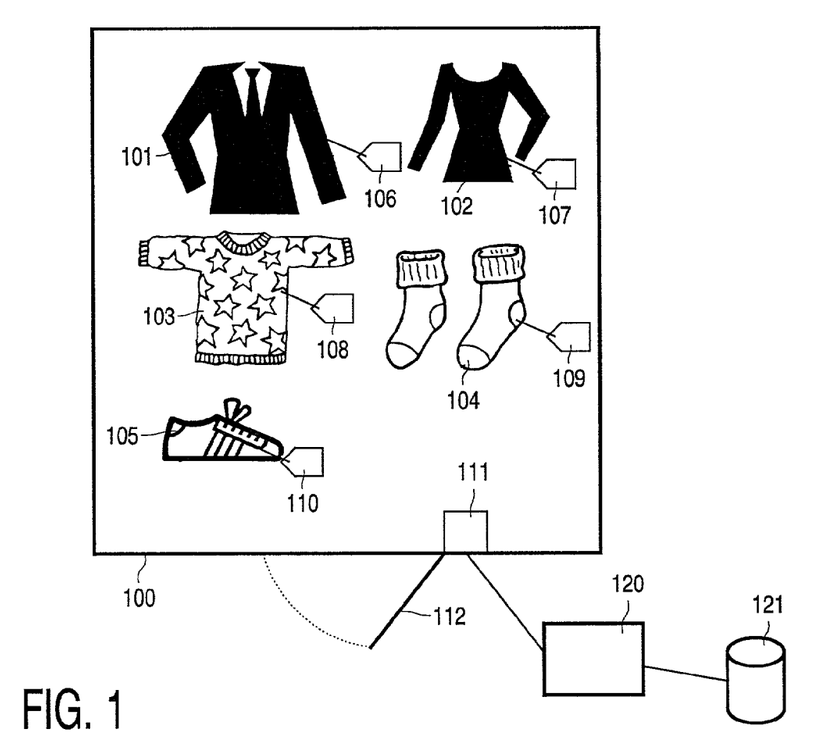
FIG. 1 schematically shows an arrangement comprising a system for recommending one or more pieces of clothing according to the invention.

FIG. 1 schematically shows an arrangement comprising a system for recommending one or more pieces of clothing to a user, consisting of a number of components. A closet, wardrobe or similar storage system 100 stores multiple articles of clothing 101–105. Articles of clothing 101–105 can be dresses, trousers, sweaters, T-shirts, suits, and so on, but also accessory or complimentary articles such as ties, socks, shoes, belts, gloves, et cetera. The articles of clothing 101–105 are provided with respective tags 106–110. A tag like tags 106–110 is a small electronic device that contains a transponder, which can generate and transmit a unique code when it receives a read-out signal, such as a radio frequency or infra-red signal. It is preferably integrated into the piece of clothing that it belongs to, and it should ideally be able to survive washing, drying, ironing and dry cleaning as well as other treatments that are normally undergone by clothing.

The code that is generated by a tag is a sequence of bits that represent attributes of the garment. Preferably the format of the bits is internationally standardized. The information encoded has to be sufficient to uniquely identify the nature of the garment to which the tag belongs. Suitable attributes include Type of the object (piece of clothing, shoe, accessory, and so on);

Size;

Brand;

Place and date of purchase;

An index into a database of clothing types;

An identifier of the owner, to allow the system also to be helpful in theft prevention, although this is not strictly required to identify the garment. This identifier can be supplied by the owner when he buys the garment.

The database of clothing types contains records, where, for every registered clothing type, a number of attributes can be retrieved, such as color, material, texture, style data, and other attributes that help characterizing that particular piece of clothing as it may occur in combinations with others. It is discussed in more detail below.

The storage system 100 has a sensor 111 located near an access point 112, such as a door or flap, through which articles of clothing 101–105 can be taken out of the storage system 100. The sensor 111 is a device that emits a read-out signal and subsequently receives the tag's code when an article of clothing having a tag is taken out of the storage system 100. Sensors can be mounted, among other places, in the portholes of wardrobe doors. The output of the sensor 111 is provided to a computer system 120. The arrangement of tags and sensors, together with the computer system 120 is such that the computer system 120 can maintain an accurate representation of all pieces of clothing 101–106 that are currently in the storage system 100, or in multiple storage systems that are integrated together. The computer system 120 has a memory 121 for holding this representation.

If any pieces of clothing 101–106 are taken out of the storage system 100, they are registered. A distinction is preferably made, by interactive dialogue or similar means, between "taken out for wearing", "taken out for cleaning", "taken out for lending to someone else", or "taken out for removing from the system" and so on. Pieces 101–105 that are entered are registered as being available. If they did not occur in the inventory previously, they apparently have been newly purchased.

The above-mentioned database with clothing information can be a central database, so that multiple computer systems 120 can access it. It can also be present locally, for example in the memory 121. If a central database is used, clothes that have no entry in the central database, such as older clothes or tailor-made or self-made pieces, can be stored in a second database on the computer 120. Records in this local database have the same format as the records on the central database, but they take their values from interactive dialogue.

Figure 2:
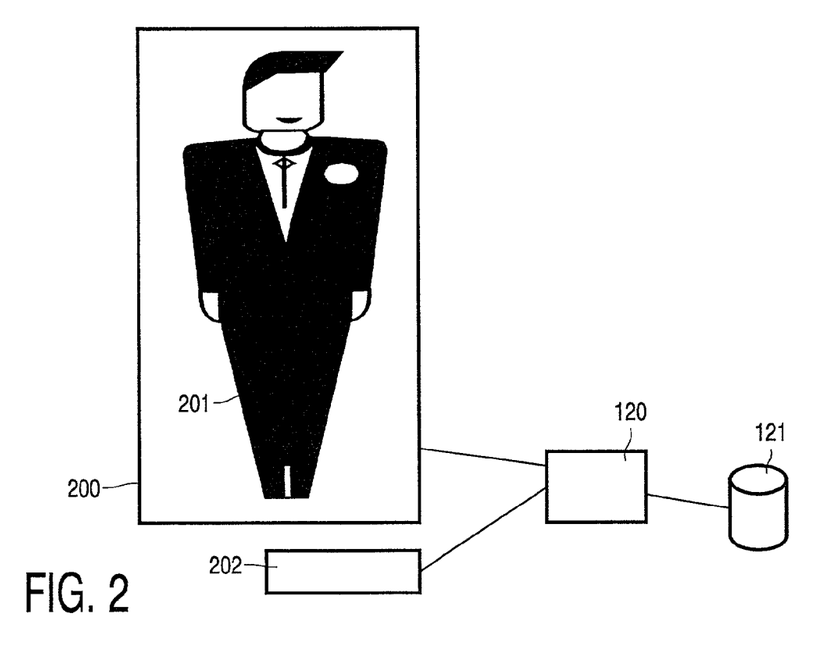
FIG. 2 schematically shows a rendering system for showing a recommendation to a user.

FIG. 2 schematically shows a rendering system 200 for presenting a recommendation 201 to a user. The computer system 120 generates a recommendation on which clothes the user should wear. This is fed to the rendering system 200, which presents it to the user. The recommendation 201 could come in the form of a small set of rendered images of a virtual mannequin, optionally with the user's face and posture, dressed in the suggested clothes. The geometric information for rendering these clothes is obtained from a database, indexed via the unique clothes type-indices.

Rendering could, among other devices, take place on a conventional computer screen; on the television screen of the bedroom TV; on a flat panel display fixed in the wardrobe closet; or on a flat panel display that is integrated in a mirror, so that the user can see her/himself simultaneous with the virtual mannequins. Alternatively, textual or voice output could be used to sum up the pieces of clothing the user should take. If the storage system 100 is sufficiently automated, the recommended pieces of clothing may even be retrieved automatically for the user.

The accepted choice is, even if some pieces are taken different from the system's advice, fed back into the system automatically by means of tag read-out. An input device 202 is provided to allow the user to indicate a purpose for which the pieces have been taken out of the wardrobe closet (wearing, cleaning, lending, . . . ). Similar, the user's intention for the day (holiday, working day, sports, . . . ) as well as the user's mood can be indicated using the input device 202. To provide an intuitive user interface, standard icons and widgets should be used. Alternatively, a coupling to a personal organizer or an electronic calendar can be used as input device 202. Note that this feedback is instrumental for the system's capabilities of building a user profile.

Figure 3:
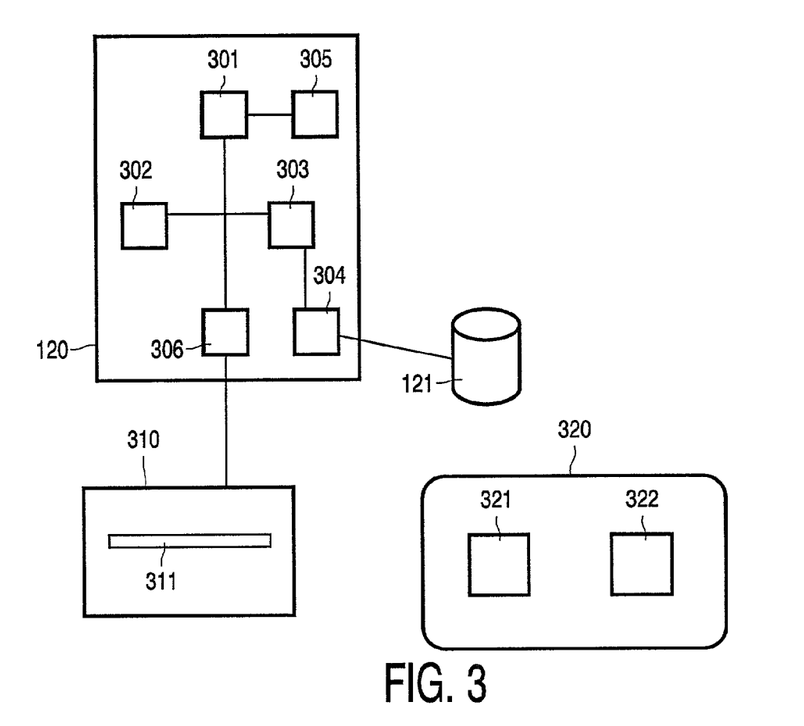
FIG. 3 schematically shows a detailed view of a system for recommending one or more pieces of clothing according to the invention.

FIG. 3 schematically shows a detailed view of the computer system 120 for recommending one or more pieces of clothing according to the invention. The computer system 120 comprises central processing unit 301, user profiling unit 302, recommendation unit 303, storage maintenance unit 304, and networking unit 305. The central processing unit 301 controls the computer system 120. The other units 302–305 may in whole or in part be provided as computer programs or modules, in which case their function is realized by having the central processing unit 301 execute said programs.

The computer system 120 may be used for a number of purposes, amongst which:

Logging and maintaining the status of all pieces in the entire storage system 100, the status of one piece being either "stored in wardrobe", "being worn", "being cleaned", "being lent to someone else", or "being removed". This information is stored in the memory 121, and maintained by the storage maintenance unit 304.

Communicating using the networking unit 305 to a central database about the attributes of a particular piece, in order to advise about its suitability in a combination with other pieces.

Building, using the user profiling unit 302, a user profile that is used by the recommendation unit 303 to assist in generating a clothing advice, either daily advice or purchasing advice. Additionally, the recommendation unit 303 may use inputs such as:

A knowledge-base+rule-base regarding color, style, and material compatibilities;

Up-to-date information about current fashion, current weather conditions and the current intentions of the user (holiday or working day? bright humor or gloomy?);

Knowledge about how long certain pieces have been worn, and whether or not pieces should be sent out for cleaning;

The variation history over the last weeks in the given context. E.g., when painting the attic, it doesn't matter to wear the same T-shirt for 10 days, but when a secretary goes out to work she might want to repeatedly vary her sweaters;

The current fashion, information about current discounts, new models that might fit with the user's taste, and affordable substitutes for expensive pieces.

The recommendations generated by the recommendation unit 303 should take some or all of the above-mentioned constraints into account. Some of these constraints take the form of rules (propositions or predicates); others may require the computation of a match or a distance D between a given combination and the user profile. If the user profile consists of a number of combinations that are favored in certain (given) circumstances, the computation of D amounts to computing the distance between two combinations for a number of pairs of combinations. In turn, this may amount to computing the weighted distance between pairs of clothes of the same kind; a small distance means a large likelihood.

The recommendation unit 303 may employ various techniques, such as genetic algorithms or neural networks, to adjust the weight parameters and/or the likelihood functions. These are adapted or trained, respectively, on the basis of implicit feedback of the user. Such implicit feedback is, for example, the fact that the user chooses the recommended pieces of clothing immediately. A suggestion's acceptance can be deduced by the recommendation unit 303 from the fact that the clothes according to the suggestion are removed from the storage system 100 with the purpose of wearing them today.

Apart from the accepted suggestion, there are other sources of feedback that can be used, such as:

Sets of newly purchased items that are added to the storage system 100 in one single instant have a high probability of going together well. This hypothesis may even be explicitly verified by interactive dialogue.

Clothing industry or other external sources may publish template user profiles or stereotypes, and the recommendation unit 303 could verify if the individual user belongs to one of the templates; if so, a more accurate prediction can be based on the (large) body of feedback obtained from all users that belong to the same stereotype.

The recommendation unit 303 can systematically interrogate the user's sensitivity to a certain parameter (say, color) by generating selection sets where the members of one such set differ with respect to this parameter only. If the reproducibility of the user's choice is high, the user's sensitivity to that parameter is probably also high.

The number of trials, and the variability among the unsuccessful trials before a successful selection is made also gives information about the user.

To illustrate the functioning of the recommendation unit 303, an example will now be given of how a rule-based system could be employed to generate recommendations. Neural networks and similar systems can easily be substituted, and they operate using the same general principles.

In this example, the recommendation unit 303 has access to a collection of rules. Such a rule could be "When the outdoor temperature is above T degrees Celsius, do not wear woolen clothing", "Blue jeans go well with flannel shirts" or "Garments Y1, Y2 and Y3 go well with garment X". An initial set of such rules is stored in the recommendation unit 303. Each rule is assigned a weight. In a given situation, such as a day, a particular activity, a weather condition or a season, a subset of these rules applies. Using one or more rules from this subset, a set of recommendations is generated.

The recommendation unit 303 reads the representation of the storage system 100 from the memory 121 to obtain a list of available clothing. It then applies the rules from the subset, eliminating those garments that match the rules. If the outdoor temperature is measured to be above the threshold T, the above-mentioned rule on woolen clothing applies, and woolen clothing will be eliminated from the list. Other applicable rules are similarly applied, which leads to a list of available clothing that are suitable for the present situation.

These clothes are then combined into matching sets, for example by combining garments with matching colors and selecting for each set at least a pair of trousers and a shirt. While combining clothes, the recommendation unit 303 can apply rules that provide constraints on combinations, such as the rule on combining blue jeans with flannel shirts. The matching sets are then fed to the rendering system 200, which presents them to the user.

The user then selects one recommended combination. This can be detected e.g. when he takes out some clothes, by comparing the identifiers of these clothes with the identifiers of the clothes in the recommended combinations. The user might also use explicit feedback to select a combination, for instance by pressing a button on the input device 202. Using explicit feedback, the user could train the system by repeatedly selecting combinations that suit his taste.

When the recommended combination is detected, the weights of the rules that led to this combination are increased with a certain amount, and others are decreased with another certain amount. This way, the weights will vary with time. After some time, these weights represent the user's preferences on clothing and combinations. If the weight of a rule drops below a certain lower threshold value, it could be eliminated from the rule set. If the weight of a rule increases above a certain upper threshold value, they could be used as input to generate one or more new, stronger, rules.

For instance, if the weight of the rule "When the outdoor temperature is above T degrees Celsius, do not wear woolen clothing" is increased often, the recommendation unit 303 may infer new rules "When the outdoor temperature is above T degrees Celsius, do not wear woolen sweaters" and "When the outdoor temperature is above T degrees Celsius, do not wear woolen socks", if the user has woolen sweaters and socks.

These new rules may be inferred using meta-rules, which state that "clothes" can be replaced with such items as "sweaters" or "socks". These meta-rules may follow from an ontology on clothing. An ontology is a set of formal definitions on types and attributes of clothing, allowing formal reasoning and automated derivations using e.g. LISP programs.

Initially, the new rules get the same weight as the original rule, which they then may replace or supplement. The weights of the new rules may vary with time, similar to the original rules' weights.

Because of time, memory or processing limitations, it may be desirable to restrict the total number of rules used by the recommendation unit 303. This can be done in various ways, for example by choosing a suitable lower threshold value. The recommendation unit 303 may also comprise a number of specialized sub-units or agents, which each maintain their own specific set of rules, with their own weights, as described above.

For instance, one sub-unit may have rules on which clothes to wear under which weather conditions, another may have rules based on the user's behavior in the past, and yet another may have rules on clothing and work. Each sub-unit generates a recommended set of garments based on its own set of rules, and these recommendations are then combined into overall sets of recommendations, preferably by taking the intersection of all the sets of recommended garments. The overall sets of recommendations are then presented to the user by the rendering system 200.

This system of sub-units makes the system more structured and well-organized, and if the sub-units operate in parallel, total processing time to obtain recommendations may well be lower than in the case of one set of rules.

The recommendation unit 303, whether comprising sub-units or not, can employ a large amount of algorithms and techniques to approximate the user's taste. One simple but effective method is the following. Assume there are $\underline{n}$ items in the storage system 100. This gives $n*(n-1)*(n-2)$ or approximately $n^3$ possible combinations of three pieces of clothing. Each of these three-tuples has a specific probability $P(n_1, n_2, n_3)$. Note that many of these tuples will never occur: no one ever wears for instance three pairs of socks at the same time. If $\underline{n}=100$, then the domain of P will contain a million elements. Although smaller or larger tuples of clothing can also be combined, the number three is chosen because one million elements can be implemented using tables efficiently and still allows a large amount of information to be stored.

All elements in the domain of P are first assigned a probability of zero. The first recommendations can be selected randomly, or be based on stereotypes or default values provided in the recommendation unit 303. Using feedback from the user, the value of P is increased for every tuple that is a subset of the outfit chosen. For instance, if the user chooses an outfit of trousers A, shirt B, socks C and sweater D, the P-values $P(A,B,C)$, $P(A,C,D)$, $P(B,C,D)$, and $P(A,B,D)$ all receive an increase.

These P-values represent the following observations:
irrespective of the trousers A, shirt B, socks C and sweater D go well together according to the user;
irrespective of the shirt B, trousers A, socks C and sweater D go well together according to the user;
irrespective of the socks C, trousers A, shirt B and sweater D go well together according to the user; and irrespective of the sweater D, trousers A, shirt B and C go well together according to the user.

Note that this is a simplification: consider the hypothetical case that a dissonance between certain trousers, certain shirts and certain socks is relieved by a certain choice of sweater. This condition cannot be represented easily by this particular system, as it is based on three-tuples. Although this may be hard to imagine, it is not an uncommon occurrence in other areas, for instance in music where the simultaneous sound of the notes B, C and C# is highly dissonant, but adding an E and a G makes a perfectly acceptable chord. However the price of this simplification is small, as these hypothetical cases in the domain of clothing outfits are expected to be very rare. On the other hand, the advantage is huge, since the P-values for the three-tuples can be stored easily, whereas storing all $n$-tuples with $n>3$ would require large amounts of resources and might be infeasible for large values of $n$. Using this system, P will in time come to represent the user's profile in terms of conditional probabilities P(i, j, k) indicating that garment i is preferred when garments $j$ and $k$ are chosen.

Recommendations are then generated as follows. The types of clothing are examined in a certain order, and for each type, the associated function P is inspected. The entries (i, j, k) for which P(i, j, k) is larger than zero indicate suitable candidates for a recommendation. It is assumed that in any preferred $n$-tuple, $n>3$, each subset with three items is also preferred. Reversing this assumption, if every three-tuple can be given a value of a preference, then preferred $n$-tuples can be chosen. These $n$-tuples can then be presented to the user as recommendations.

Part of the functions of the computer system 120 has to do with logging the user's choices. This serves both the construction of a user profile, and the evaluation of time dependent criteria, such as 7 and 8. Further time dependent functionality includes informing the user about new products and season's discounts. Here, a coupling to the user profile can safeguard the user from receiving too much unwanted advertisement materials.

The knowledge about the user's clothing preference profile, as it accumulates in the system, can be stored in the memory 121, but can also be stored in the format of a smart card 320. To this end, the computer system 120 may have smart card read/write unit 306, which are coupled to a smart card reception unit 310, with smart cart insertion point 311. Apart from the clothing preference profile, this smart card may also contain the information about the user's current storage system 100 stored on local memory 321. The smart card 320 also has processor unit 322 for maintaining the information on the local memory 321, for example by restricting access to the information to trusted devices. As a service to customers, fashion shops may install smart card readers, coupled to dress advice systems of the same sort as described above, with a database of the shop's current assortment. If a customer inserts her/his smart card 320 into the system, a personalized purchase advice can be generated that takes into account both the requirements of compatibility to the customer's current collection and the customer's preference profile.

Using the information stored on the smart card 320, perhaps in combination with information about the user stored in the shop, the shop can determine which items from its collection may be of interest to the user, and offer those to the user for sale, perhaps at a discount. To this end, the shop compares the list with its own inventory to the user's clothing preference profile, and applies a rule-based system, expert system, neural network or similar system to obtain a set of items that are likely to be of interest to the user. As an example, in a rule-based system the following rules could be used to obtain recommendations:

Eliminate from the list those items that are not available in the user's size.

If the user is male, eliminate female clothes from the list, and vice versa.

If the user possesses no formal wear, ties should be moved lower on the list.

Determine the values of the attribute "color" for the user's clothes, and move items which match these values, or which have complementary values, higher on the list.

If other customers bought item X and item Y, and the user owns item X, move item Y higher on the list.

Using rules such as the ones above, or using another system, the shop obtains a list with items that are likely to be of interest to the user, and can present these to the user. This presentation can be in the form of a textual or graphical listing, but the virtual mannequin as described with reference to FIG. 2 could also be used. The list could also be used by a shop assistant to retrieve those items so the user can immediately try them on.

If the user chooses to buy an item, this reinforces or updates the user's clothing preference profile. The information can also be fed to a database holding multiple user profiles, so that they can all be updated as a result of this item being bought. This allows the store to learn from its customers which items are preferred in which situations.

Figure 4:
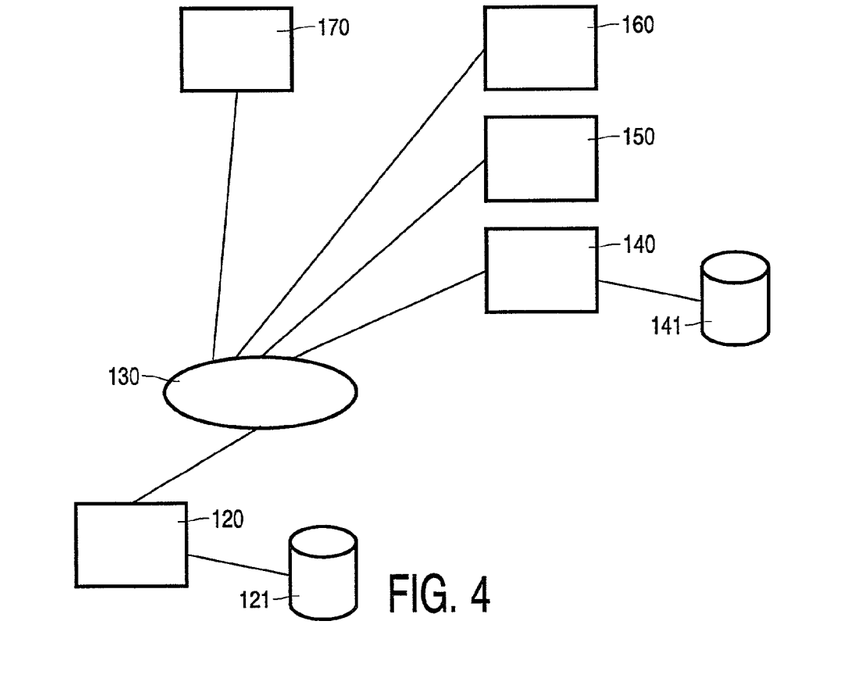
FIG. 4 schematically shows an arrangement of a system for recommending one or more pieces of clothing coupled to a network with computer systems.

This technique can be used both to physical stores, where the user presents his smart card 320 to a smart card reader installed in the store, and the store's computer system makes the determination and presents the items of interest, and to electronic shopping systems 160. The user can upload his profile to the electronic shopping system 160, which then uses it in a manner similar to the physical store. The user could also provide his profile to a local smart card reader, which extracts only the relevant information, processes it and submits it to the electronic shopping system 160. This way, the electronic shopping system 160 does not get access to more information than it needs, which protects the user's privacy.

A physical or electronic shop could also provide its inventory list, or a suitable portion of it, to the computer system 120, for example by e-mail or by offering it for download on a Website. The recommendation unit 303 then generates recommendations for items on the inventory list and feeds them to the rendering system 200 which presents them to the user. The recommendation unit 303 can also feed them to the smart card read/write unit 306 so they are stored on the smart card 320. The recommendations are then available when the user goes shopping. This allows the user to make a selection from the inventory list at his leisure, and to compare the selection to the pieces of clothing he already has, while generating more attention and possible sales to the shop providing the list.

FIG. 4 schematically shows an arrangement of the system 120 for recommending one or more pieces of clothing coupled to a network 130, such as the Internet, with computer systems 140, 150, 160, 170. The computer system 140 is a central server with a central database 141, which could be maintained by some branch organization or independent body. Part of the information that is kept in the database 141 is objective and can be automatically retrieved from the clothes design studios (size, used textile material). Others can be retrieved with some effort, such as dominant colors. For single-colored garments, the color can be trivially expressed in a standardized color coordinate system. However, for multi-colored designs, there should be a notion of "dominant color(s)", and possibly even some characteristics of the design should be encoded ("geometric", "busy", "abstract", "flowers", "localized", "repetitive", "logo", . . . ). A third category of attributes definitely needs human expertise to encode ("extravagant", "baroque", "conspicuous", "fashionable", "sexy", . . . ). This category may also include binary or conditional relations ("goes well with . . . ", "should not be worn by tall women unless combined with a differently colored belt", Access to the database 141 can be restricted to authorized parties, such as the user's system 120, public dress assistant systems 150 as installed in fashion shops, electronic shopping systems 160, fashion industry and market organizations, and relevant writing press. To attract prospective users, the computer system 140 might also have a publicly accessible Website. Advertiser system 170 may also have access to the database 141. An advertisement system 170 can, using a user's clothing preferences as an input, generate or obtain advertisements targeted to that user. The clothing preferences can be combined with other inputs, such as the user's observed shopping behavior, to determine which clothing he may be interested in. After being sent to the user, the targeted advertisements can be presented to the user on the rendering system 200 as conventional textual, audio, graphical and/or animated messages. However, if the advertisements relate to clothing, the advertisement could include an identifier for the advertised clothing. This identifier can be used to obtain information on the advertised clothing in a database, similar to how information on the clothing in the user's possession is obtained. Then, the rendering system 200 can present the virtual mannequin 201 dressed in the advertised clothing in combination with some of the other items already owned by the user, as described with reference to FIG. 2.

When the targeted advertisements are presented to the user, he might very well find the advertisements to be of sufficient interest to buy them. The input device 202 can to that end provide a "buy" button, which when selected causes the computer system 120 to generate an order request for the advertised product and send it to the electronic shopping system 160. This system 160 will then process the order request and arrange for the ordered product to be delivered to the user. As an example, the method as described in U.S. patent application Ser. No. 09/498,261 (PHUS000036) to the same applicant as the present application can be used. In this application is described a method of purchasing content related material, whereby a "buy" button is provided on devices that receive content material. When this material is being displayed or rendered otherwise to the user, he/she can press the "buy" button to indicate that this material is of interest to him, which generates a purchase request. The purchase request, which may include information such as a customer identification number or a credit card number, is communicated to an electronic shopping system and processed there. In this case, the content material being rendered is a piece of clothing, and if the user likes this piece of clothing, he/she can buy it using the "buy" button.

The recommendation system 120 can operate in various modes. In an ideal situation, upon opening the storage system 100 door, the system 120 automatically presents a small amount of combinations, taken from the currently available collection, taking into account what it understands of the user's preference and the further conditions and constraints. If the user agrees with one of the suggestions, she/he takes the recommended pieces out of the storage system 100. This is automatically detected by the system 120, and no further dialogue is necessary: the system assumes that the recommended pieces will be worn today. As a side effect, unnoticed by the user, this reinforces or updates the internally stored preference profile.

More involved scenarios include those where the user deviates from the proposed combinations, or where the user inputs the occurrence of special circumstances ("I take these pieces out to get them cleaned", "today is a holiday", "I feel very energetic today") to the system. In the case of a deviation from the proposed combinations, a dialogue may follow where the system 120 asks further information.

For experienced and/or advanced users, dialogues may be available to
  input pieces into the collection that don't come with
    standard tags (e.g., tailor-made, old, or self-made
    pieces);
  inquire directly about parameters in the user's preference
    profile and maybe even edit these parameters;
  optionally, even rules or scripts may be entered (e.g., "on
    Mondays I like to wear red except if it rains')

This dialogue can be performed using the input device 202 and the rendering system 200. Alternatively, voice input/output can be used. The system 120 could also be coupled to a personal computer to allow direct access to the database, the parameters and so on, which allows for advanced inputting or direct manipulation.

The system 120 can give various unsolicited hints, e.g. advising certain pieces to get cleaned based on how often they have been worn since the last cleaning. Other hints most often will be given as a consequence of the events occurring during normal operation, where the system may inform about certain circumstantial changes (fashionable colors have changed, it is getting colder). Such hints can for example be presented as audio messages when the user takes the relevant piece(s) out of the storage system 100.

Depending on the time of day the system 120 is accessed and/or the state of the user with respect to dressing, as far as the system can infer this, the system may guess whether the regular scenario applies, or the user wants to receive a purchase advice. For a purchase advice, the user always has to engage in a dialogue, answering questions such as what type of object is to be purchased, what is the intended price, or with what other pieces should the new piece combine well.

On a regular basis, or at the request of the user, or as the result of an advertisement initiative of a shop or a sales organization, the system 120 may propose the user to purchase a new item or items for her/his storage system 100. If the accuracy of the user's preference profile is high, the advice could narrow down to one particular article; the virtual mannequin 201 could show the effect of that article in combination with some of the other items already owned by the user. If the accuracy is not (yet) very high, the advice should be restricted to more global terms, for example "You may want to buy a new thick sweater now: you only possess two, whereas you have abundant thin ones, and Winter sweaters are currently on discount at X".

As explained earlier, the smart card 320 carries both information about the customer's current collection and her/his preference profile in the memory 321. Specialized shops can form alliances with shops in different market niches. Say, a costume shop may match with a shoe shop; if a user plans to buy a costume he/she could be informed (by means of the virtual mannequins) about matching shoes. Exploration of a public version of the dress advisor is lucrative in its own right, even if not tied to the assortment of particular fashion vendors.

Based on the data format of the tags, the central database 141, and the smart card 320, there could be several products tied to the system that all can interoperate. Tags 106–110, sensor 111, computer systems 120, storage systems 121, application software and Internet services could all be produced and explored by different vendors; also, multiple vendors could be active in the same product area. Therefore, establishing these standards should be the first step in introducing the system. Also, in the beginning there will be a large body of existing clothes that do not occur in the database. So field programmable tags, together with end-user friendly tag programming protocols are instrumental for this system to be successful. As an alternative to field-programmable tags, there could be tags that each generate a unique, but different code. The translation of one such code into a code that actually refers to an identifiable clothes type as maintained in the local version of a user's database is an all-software issue. Although the description in these initial, non-industrially defined clothes types may be less articulated than the full-fledged versions, there still could be standardized generic clothes type taxonomy to allow at least partial functioning of the system during this first bootstrap phase. This clothes type taxonomy should be simple enough to allow end users to program the tag indices in their storage system 100.

Individuals are willing to pay for their local system as it takes the burden of daily clothes selection. They are even willing to pay for subscription to the Internet service, to get access to the centralized database 141, as this will ensure that they get accurate and relevant purchasing advice, they are kept up-to-date with current trends in fashion etc. Similar, fashion industry and sales organizations are willing to contribute to paying for the system, to take better advantage of a limited advertisement budget: it allows much more directed access to target customers plus the ability to have backdoor entrance to the customer's taste and opinions. This keeps costs low for the end users.

However, in the start-up phase (with few industrially tagged clothes on the market) the benefits for the end users are small. Indeed, however convenient a generic clothes type taxonomy can be made, it will always be a burden to hand-tag all one's clothes. Also, with few sold copies, the equipment (sensors, computer+mirror/screen combination) will be expensive. Therefore, there have to be additional scenarios to overcome the bootstrap phase. Some possible scenarios:

Tags can be given a secondary purpose: they serve in the automated routing and logistic between factory and shop. Tagged clothes are not more expensive than non-tagged clothes, and the customer won't even notice that the new items she/he purchases are tagged. After a few years, a significant percentage of all clothes will be tagged, and then the production and marketing of the end-user systems can take off with immediate benefit of the user.

Insurance companies distribute tags, not only to be connected to clothes, but to all mobile sustainable goods in the household. Also, the insurance companies assist in distributing classification software. If a significant percentage of the goods are tagged and appropriately classified, reduction in insurance premiums will result. For this scenario to work, standardization of tag data format and mechanical properties of tags is more involved.

As an additional service, laundries can add tags to clothes and take care of appropriate classification. As tags can point to information related to cleaning, they could save labor for laundry operators. Since laundries therefore benefit from tags being present, it could be a free service to the end users, again ensuring a dense proliferation of tagged clothes on the long run.

An all-software solution lowers the initial investment threshold for the end-user and still could emulate part of the system's functionality, in particular purchase advices and prompting for new combinations. It requires the effort of an end user, compared to set up a database of one's books, CDs, or wine collection. Access to the central database 141 both facilitates this endeavor and increases the benefits (personalized advice in case of recent fashion-related trends, etc.). Also, this system could be sponsored by fashion industry in the form of discounts on purchases; indeed, although less accurate than with industrially tagged clothes, it already gives backdoor access to the end-user's taste and dressing habits. An additional bonus could be a subscription to a second-hand or clothes rental network.

Further extensions of the original system include:

Interactive art in the home or working environment that matches to the daily moods and preferences of the inhabitants. Indeed, a light sculpture (e.g. based on modifiable liquid crystal filters) could be envisaged where the dominant colors match (or contrast) with the colors or textures in the selected clothes combination of the day Videophone: low-bandwidth videophones should still convey a more or less actual impression of the communication partner. Work in progress in facial animation aims at synthesizing the face of the speaker. If the computer system 'on the other side' knows what the person is wearing, it could also transmit this information in a compact form, and synthesize the present clothes.

A person's varying preference for clothing is related to other aspects of one's mood. This knowledge could be used in future domestic applications to adjust, say, lighting, temperature, sound level and other parameters in a non-obtrusive way.

The invention claimed is:

1. A computerized method of providing a recommendation to a user for a recommended piece of clothing from an inventory of apparel of the user, for use by the user, comprising:
    maintaining a clothing profile of the user, including the inventory of apparel and preferences of the user,
    detecting a piece of clothing being selected from the inventory and updating the clothing profile based on said selection,
    generating the recommendation for the recommended piece of clothing from the updated clothing profile, and
    providing the recommendation to the user.

2. A system for generating a recommendation to a user for a recommended piece of clothing from an inventory of apparel of a user, for use by the user, comprising:
    a user profiling unit that is configured to maintain a clothing profile of the user, including the inventory of apparel and preferences of the user,
    one or more sensors that are configured to detect a selected piece of clothing being selected from the inventory, coupled to the database for updating the clothing profile based on the selected piece of clothing,
    a recommendation unit that is configured to generate the recommendation for the recommended piece of clothing from the updated clothing profile, and
    a rendering system that is configured to present the recommendation to the user.

3. The system of claim 2, wherein
the recommendation unit is further configured to:
 determine a list of available pieces of clothing from the inventory, and
 combine plural pieces from the list to form a collection of subsets,
the recommendation comprising at least one subset from the collection of subsets.

4. The system of claim 3, wherein
the recommendation unit is further configured to eliminate from the collection a number of subsets that are not suitable for a present situation.

5. The system of claim 2, wherein
the user profiling unit is coupled to a smart card reader/writer that is configured to maintain the clothing profile stored on a smart card.

6. The system of claim 2, further comprising
input means for determining a purpose for which the piece of clothing has been selected,
the user profiling unit being further configured to update the clothing profile further based on the determined purpose.

7. The system of claim 6, wherein
the input means is arranged to determine the purpose based on an appointment in an electronic calendar.

8. A computerized method of presenting a targeted clothing advertisement to a user, comprising
 obtaining a clothing profile for the user,
 determining a clothing product that matches the clothing profile,
 sending an identifier of the clothing product to the user,
 generating a representation of the clothing product using the identifier, and
 rendering the representation to the user.

9. The method of claim 8, wherein the clothing profile is obtained by reading the clothing profile from a smart card.

10. A computerized method of presenting a recommendation of an ensemble to a user, comprising:
 maintaining an inventory of apparel possessed by the user,
 determining one or more subsets of apparel from the inventory suitable for forming the ensemble, based on a one selected from: a user preference, current fashion, a dress code, or prior selected ensembles, and
 presenting at least one of the one or more subsets of apparel to the user.

11. The method of claim 10, wherein determining the one or more subsets suitable for forming the ensemble is based on at least one of:
 a dominant color of the ensemble,
 a color of each apparel in the subset,
 a dominant style of the ensemble,
 a time of year for wearing the ensemble,
 a time of day for wearing the ensemble, and
 current environmental conditions.

12. The method of claim 10, wherein
determining the one or more subsets suitable for forming the ensemble includes at least one of:
 applying one or more rules,
 determining one or more distances,
 determining one or more weights, and
 modifying parameters used for determining the one or more subsets based on prior user selections.

13. The method of claim 10, further including
identifying an apparel item that is not in the inventory that would form another subset suitable for forming the ensemble if combined with apparel in the inventory.

14. An apparel recommendation system comprising:
 an inventory system that is configured to maintain an inventory of apparel possessed by a user,
 a processor that is configured to identify one or more subsets of apparel in the inventory suitable for forming an ensemble, and
 a display that is configured to present at least one of the one or more subsets of apparel to the user,
wherein
at least some of the apparel includes a tag that identifies the apparel to the inventory system.

15. The system of claim 14, wherein
the processor is configured to identify the one or more subsets based on a one selected from: a user preference, current fashion, a dress code, prior selected apparel, or prior selected ensembles.

16. The system of claim 14, wherein
the processor is configured to identify the one or more subsets based on at least one of:
 a dominant color of the ensemble,
 a color of each apparel in the subset,
 a dominant style of the ensemble,
 a time of year for wearing the ensemble,
 a time of day for wearing the ensemble, and
 current environmental conditions.

17. The system of claim 14, wherein
the processor is configured to identify the one or more subsets via at least one of:
 applying one or more rules,
 determining one or more distances,
 determining one or more weights, and
 modifying parameters used for determining the one or more subsets based on prior user selections.

18. The system of claim 14, further including:
a network interface that is configured to facilitate receipt of advertisements for other apparel,
the processor is further configured to filter the advertisements based on whether the other apparel forms another subset suitable for forming another ensemble if combined with apparel in the inventory, and
the display is further configured to present the another subset to the user.

19. The system of claim 18, further including:
an input device that facilitates a purchase of the other apparel in the another subset by the user.

20. The system of claim 14, further including
a smart card read/write device, and
wherein the processor is further configured to transfer some or all of the inventory of apparel to a smart card via the smart card read/write device.

21. The system of claim 20, wherein
the processor is further configured to transfer one or more user preferences to the smart card via the smart card read/write device.

22. The system of claim 14, wherein
the system is further configured to detect an initial selection of a first apparel item, and
the processor is configured to identify the one or more subsets based on this initial selection.

* * * * *